(12) United States Patent
Miwa

(10) Patent No.: US 11,607,914 B2
(45) Date of Patent: Mar. 21, 2023

(54) TWO-WHEELED VEHICLE TIRE

(71) Applicant: SUMITOMO RUBBER INDUSTRIES, LTD., Hyogo (JP)

(72) Inventor: Takuya Miwa, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 423 days.

(21) Appl. No.: 16/256,127

(22) Filed: Jan. 24, 2019

(65) Prior Publication Data
US 2019/0241021 A1 Aug. 8, 2019

(30) Foreign Application Priority Data

Feb. 8, 2018 (JP) .............................. JP2018-021254

(51) Int. Cl.
*B60C 11/03* (2006.01)
*B60C 11/13* (2006.01)
*B60C 11/11* (2006.01)

(52) U.S. Cl.
CPC ........... *B60C 11/0306* (2013.01); *B60C 11/11* (2013.01); *B60C 11/1369* (2013.01); *B60C 2011/0351* (2013.01); *B60C 2200/10* (2013.01); *B60C 2200/12* (2013.01); *B60C 2200/14* (2013.01)

(58) Field of Classification Search
CPC ................. B60C 11/11; B60C 11/1369; B60C 2011/0351; B60C 2200/10; B60C 2200/14; B60C 11/12
See application file for complete search history.

(56) References Cited

U.S. PATENT DOCUMENTS

| | | | | |
|---|---|---|---|---|
| 6,651,711 B2 * | 11/2003 | Matsumura | ............. | B60C 11/11 152/209.11 |
| 6,799,617 B2 * | 10/2004 | Matsumura | ......... | B60C 11/0318 152/209.2 |
| 2008/0245457 A1 * | 10/2008 | Sueishi | ................... | B60C 11/01 152/209.11 |
| 2013/0014868 A1 * | 1/2013 | Ishida | ..................... | B60C 11/11 152/209.11 |
| 2013/0284333 A1 * | 10/2013 | Ishida | ................. | B60C 11/1376 152/209.18 |
| 2015/0083306 A1 * | 3/2015 | Colby | .................... | B60C 11/04 156/96 |

(Continued)

FOREIGN PATENT DOCUMENTS

| | | | | |
|---|---|---|---|---|
| CN | 203902170 | * | 10/2014 | |
| DE | 10258812 A1 * | | 7/2004 | ............. B60C 11/11 |

(Continued)

OTHER PUBLICATIONS

European Office Action, European Patent Office, Patent Application No. 19150894.4, dated Jun. 25, 2019, 7 pages.

*Primary Examiner* — Alison L Hindenlang
*Assistant Examiner* — Debjani Roy
(74) *Attorney, Agent, or Firm* — Greenblum & Bernstein, P.L.C.

(57) ABSTRACT

A two-wheeled vehicle tyre includes a tread portion which is provided with a row of crown blocks arranged on a tyre equator and a row of middle blocks arranged axially outwardly of the row of crown blocks. Circumferential pitch lengths of directly adjacent crown blocks are greater than circumferential pitch lengths of directly adjacent middle blocks.

19 Claims, 2 Drawing Sheets

(56) References Cited

U.S. PATENT DOCUMENTS

| | | | | |
|---|---|---|---|---|
| 2015/0122383 A1* | 5/2015 | Hikita | ............... | B60C 11/1369 |
| | | | | 152/209.11 |
| 2015/0360517 A1* | 12/2015 | Miwa | .................. | B60C 11/11 |
| | | | | 152/209.11 |
| 2016/0214439 A1* | 7/2016 | Ogo | .................... | B60C 11/033 |
| 2019/0039417 A1* | 2/2019 | Hikita | ................. | B29D 30/16 |

FOREIGN PATENT DOCUMENTS

| | | |
|---|---|---|
| EP | 0368582 A2 | 5/1990 |
| EP | 3047982 A1 | 7/2016 |
| EP | 3444130 A1 | 2/2019 |
| JP | H08332809 | * 12/1996 |
| JP | 2003-72318 A | 3/2003 |
| WO | 01/43958 A1 | 6/2001 |

* cited by examiner

TWO-WHEELED VEHICLE TIRE

BACKGROUND ART

Field of the Disclosure

The present disclosure relates to tyres, more particularly to a two-wheeled vehicle tyre which is suitably used for traveling on rough terrain.

Description of the Related Art

Conventionally, various two-wheeled vehicle tyres which are suitably used for traveling on rough terrain have been proposed. For example, the following Patent document 1 discloses a tyre tread which is provided with a row of central blocks and a row of middle blocks, wherein circumferential pitch lengths of the central blocks are set smaller than circumferential pitches length of the middle blocks.

PATENT DOCUMENT

Patent Document 1

Japanese Unexamined Patent Application Publication 2003-072318

SUMMARY OF THE DISCLOSURE

Unfortunately, since the two-wheeled vehicle tyre disclosed in Patent document 1 has middle blocks which are arranged at relatively large circumferential pitch lengths, less traction when cornering on hard terrain was generated, leading to insufficient cornering performance.

In view of the above problems in the conventional art, the present disclosure has a main object to provide two wheeled vehicle tyres capable of improving straight-traction property as well as cornering performance, while maintaining mud discharging property.

According to one aspect of the disclosure, a two-wheeled vehicle tyre include a tread portion being provided with a row of crown blocks arranged on a tyre equator and a row of middle blocks arranged axially outwardly of the row of crown blocks, wherein circumferential pitch lengths of directly adjacent crown blocks are greater than circumferential pitch lengths of directly adjacent middle blocks.

In another aspect of the disclosure, the circumferential pitch lengths of directly adjacent crown blocks may be in a range of from 1.1 to 1.5 times the circumferential pitch lengths of directly adjacent middle blocks.

In another aspect of the disclosure, at least one of the crown blocks may be provided with a crown shallow groove extending on and along the tyre equator.

In another aspect of the disclosure, the crown shallow groove may have a groove depth in a range of from 10% to 35% of a maximum height of the at least one of the crown blocks.

In another aspect of the disclosure, the tyre may include a tyre main body that continuous over a tyre circumferential direction at a same cross-sectional shape and that extends between axially spaced bead portions through the tread portion and sidewall portions, and the crown blocks may be arranged such that when ground contact surfaces of the crown blocks are projected onto an outer surface of the tyre main body along each tyre normal line of the crown blocks, each projected region of the crown blocks is located within a region of 13% of an outer surface length of the tyre main body from a tyre equatorial plane to a bottom of one of the bead portions, from the tyre equatorial plane.

In another aspect of the disclosure, the middle blocks may be arranged such that when ground contact surfaces of the middle blocks are projected onto an outer surface of the tyre main body along each tyre normal line of the middle blocks, each projected region of the middle blocks is located within a region of from 20% to 34% of an outer surface length of the tyre main body from a tyre equatorial plane to a bottom of one of the bead portions, from the tyre equatorial plane.

In another aspect of the disclosure, the crown blocks and the middle blocks may be separated from one another in a tyre axial direction when viewed from a tyre circumferential direction.

In another aspect of the disclosure, the tyre may include a row of shoulder blocks arranged axially outwardly of the row of middle blocks, wherein circumferential pitch lengths of directly adjacent shoulder blocks may be same as the circumferential pitch lengths of directly adjacent middle blocks.

In another aspect of the disclosure, the shoulder blocks may be arranged such that when ground contact surfaces of the shoulder blocks are projected onto an outer surface of the tyre main body along each tyre normal line of the shoulder blocks, each projected region of the shoulder blocks is located within a region of from 36% to 47% of an outer surface length of the tyre main body from a tyre equatorial plane to a bottom of one of the bead portions, from the tyre equatorial plane.

In another aspect of the disclosure, the middle blocks and the shoulder blocks may be overlapped with each other in a tyre axial direction when viewed from a tyre circumferential direction.

In another aspect of the disclosure, a reinforcing portion connecting one middle block and the adjacent shoulder block may be provided.

DESCRIPTION OF THE PREFERRED EMBODIMENTS

An embodiment of the present disclosure will be explained below with reference to the accompanying drawings.

Figure 1:
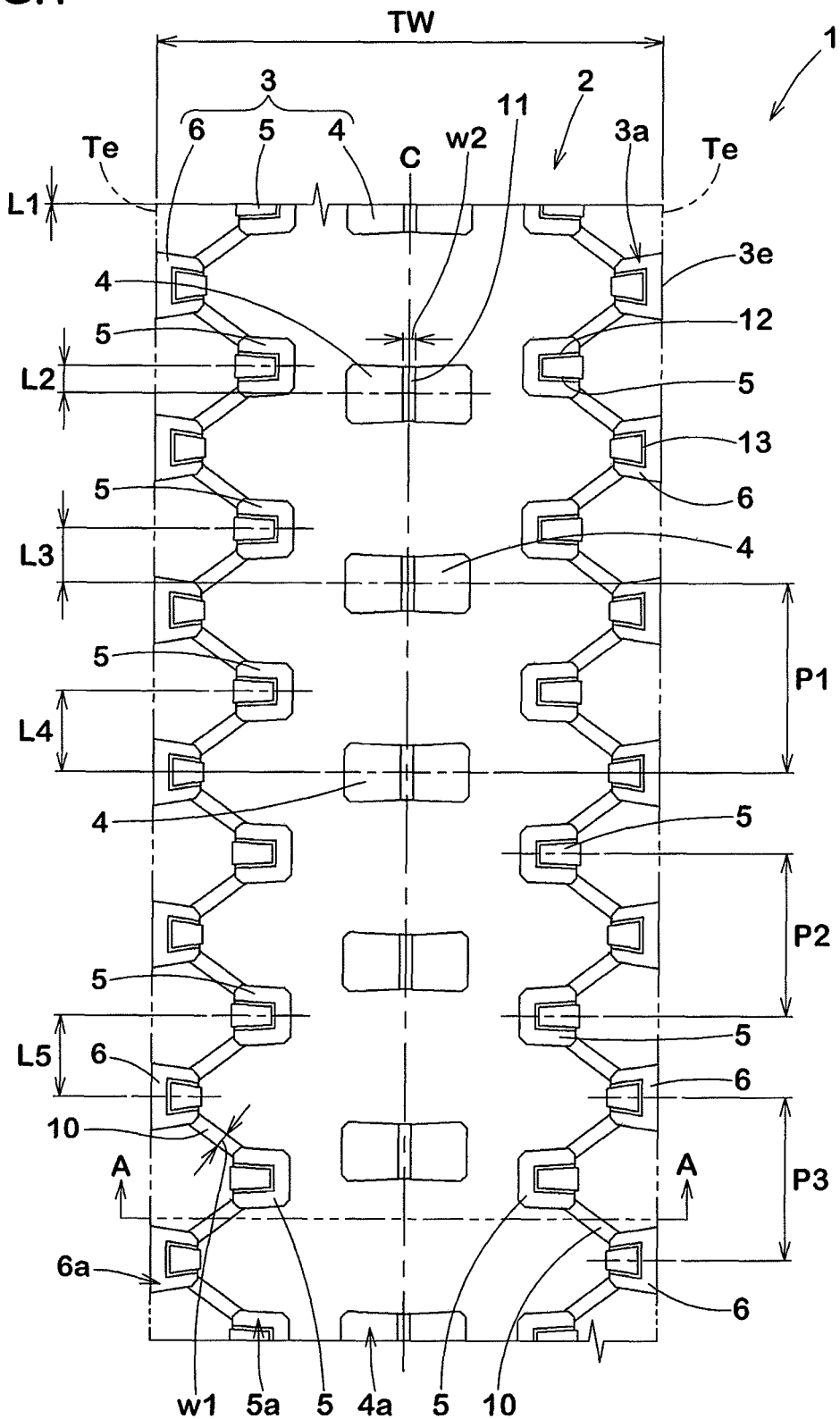
FIG. 1 is a development view of a tread portion of a two-wheel vehicle tyre in accordance with an embodiment of the disclosure.

FIG. 1 illustrates a development view of a tread portion 2 of a two-wheeled vehicle tyre (hereinafter, simply referred to as "tyre") 1 in accordance with an embodiment of the disclosure.

As illustrated in FIG. 1, the tyre 1 includes some blocks 3 provided on the tread portion 2. The tyre 1, for example, is installed to motorcycles which are suitable for traveling on rough terrain, e.g., motocross.

The blocks 3 according to the embodiment include a row of crown blocks 4 arranged on the tyre equator C and a row of middle blocks 5 arranged axially outwardly of the row of crown blocks 4 at least axially one side of the crown blocks 4. As used herein the tyre equator C means the center location between tread edges Te. Further, as used herein, the tread edges Te means respective axially outermost edges 3e of ground contact surfaces 3a of the blocks 3 which are arranged outermost in the tyre axial direction among the blocks 3.

In this embodiment, circumferential pitch lengths P1 of directly adjacent crown blocks 4 are greater than circumferential pitch lengths P2 of directly adjacent middle blocks 5.

Tread portion 2 having the circumferential pitch lengths P1 of directly adjacent crown blocks 4 different from the circumferential pitch lengths P2 of directly adjacent middle blocks 5 provides superior mud discharging property, improving straight-traction performance of the tyre. Further, the tread portion 2 provides edge scratching effect of the crown blocks 4 and the middle blocks 5 to the tyre axial direction, resulting in suppressing sideslip when cornering to improve cornering performance. Furthermore, since the circumferential pitch lengths P2 of directly adjacent middle blocks 5 are smaller than the circumferential pitch lengths P1 of directly adjacent crown blocks 4, the tread portion 2 exhibits high rigidity when cornering, improving cornering performance further.

Preferably, the circumferential pitch lengths P1 of the crown blocks 4 are in a range of from 1.1 to 1.5 times the circumferential pitch lengths P2 of the middle blocks 5. When the pitch lengths P1 of the crown blocks 4 are less than 1.1 times the pitch length P2 of the middle blocks 5, mud discharging property of the tread may not improve since the pitch-length differences P1-P2 between the crown blocks 4 and the middle blocks 5 become small. When the pitch lengths P1 of the crown blocks 4 are greater than 1.5 times the pitch lengths P2 of the middle blocks 5, mud discharging property of the tread upon cornering may not improve since the pitch lengths L2 are prone to be small.

Note that the pitch lengths P1 and P2 of the crown blocks 4 and the middle blocks 5, respectively, may be a predetermined constant value. Alternately, at least one of the pitch length P1 and P2 may be a variable-pitch arrangement which includes different kinds of pitch lengths selected from a predetermined pitch length range. In case of the variable-pitch arrangement, the pitch lengths P1 of the crown blocks 4 are preferably in a range of from 1.1 to 1.5 times a pitch length P2 of a middle block 5 adjacent to the concerned crown block 4.

Preferably, the crown blocks 4 are arranged in relation to the middle blocks 5 in such a manner that circumferential gaps between crown blocks 4 and middle blocks 5 vary. As used herein, the circumferential gaps each mean a circumferential length between circumferential center locations of two blocks 3 arranged proximately with each other (i.e., one crown block 4 and the middle block 5 proximate to the concerned crown block 4 in this case). In this embodiment, four kinds of different circumferential gaps including the first to fourth gaps L1 to L4 respectively are provided on the rows of the crown blocks 4 and the middle blocks 5.

In this embodiment, the first to fourth gaps L1 to L4 satisfy the following relation: L1<L2<L3<L4. The first gap L1, for example, is in a range of from 0% to 0.3% of a tyre entire circumferential length measured on the tyre equator C. The second gap L2, for example, is in a range of from 0.1% to 0.5% of the tyre entire circumferential length. The third gap L3, for example, is in a range of from 0.3% to 1.0% of the tyre entire circumferential length. The fourth gap L4, for example, is in a range of from 0.5% to 1.3% of the tyre entire circumferential length. The tread portion 2 as described above can improve straight-traction performance and cornering performance, while maintaining mud discharging property, on various kinds of road conditions including soft and hard roads.

In this embodiment, the tread portion 2 further includes a pair of rows of shoulder blocks 6 arranged axially outwardly of the rows of middle blocks 5. Preferably, circumferential pitch lengths P3 of directly adjacent shoulder blocks 6 are equal to the circumferential pitch lengths P2 of the middle blocks 5. Such a tread portion 2 improves mud discharging property as well as rigidity when cornering, thus improving cornering performance.

Preferably, the circumferential gaps between the middle blocks 5 and the shoulder blocks 6 are substantially constant. In this embodiment, the middle blocks 5 are arranged in relation to the shoulder blocks 6 to have substantially constant fifth gaps L5 as the circumferential gaps. Preferably, the fifth gaps L5, for example, are in a range of from 1.1% to 1.3% of the tyre entire circumferential length. Such a tread portion 2 can improve cornering performance on various kinds of road conditions including soft and hard roads.

Preferably, the tread portion 2 has a land ratio ranging from 15% to 26%. Such a tread portion 2 can improve straight-traction performance as well as cornering performance, while maintaining mud discharging property, on various kinds of road conditions including soft and hard roads.

Figure 2:
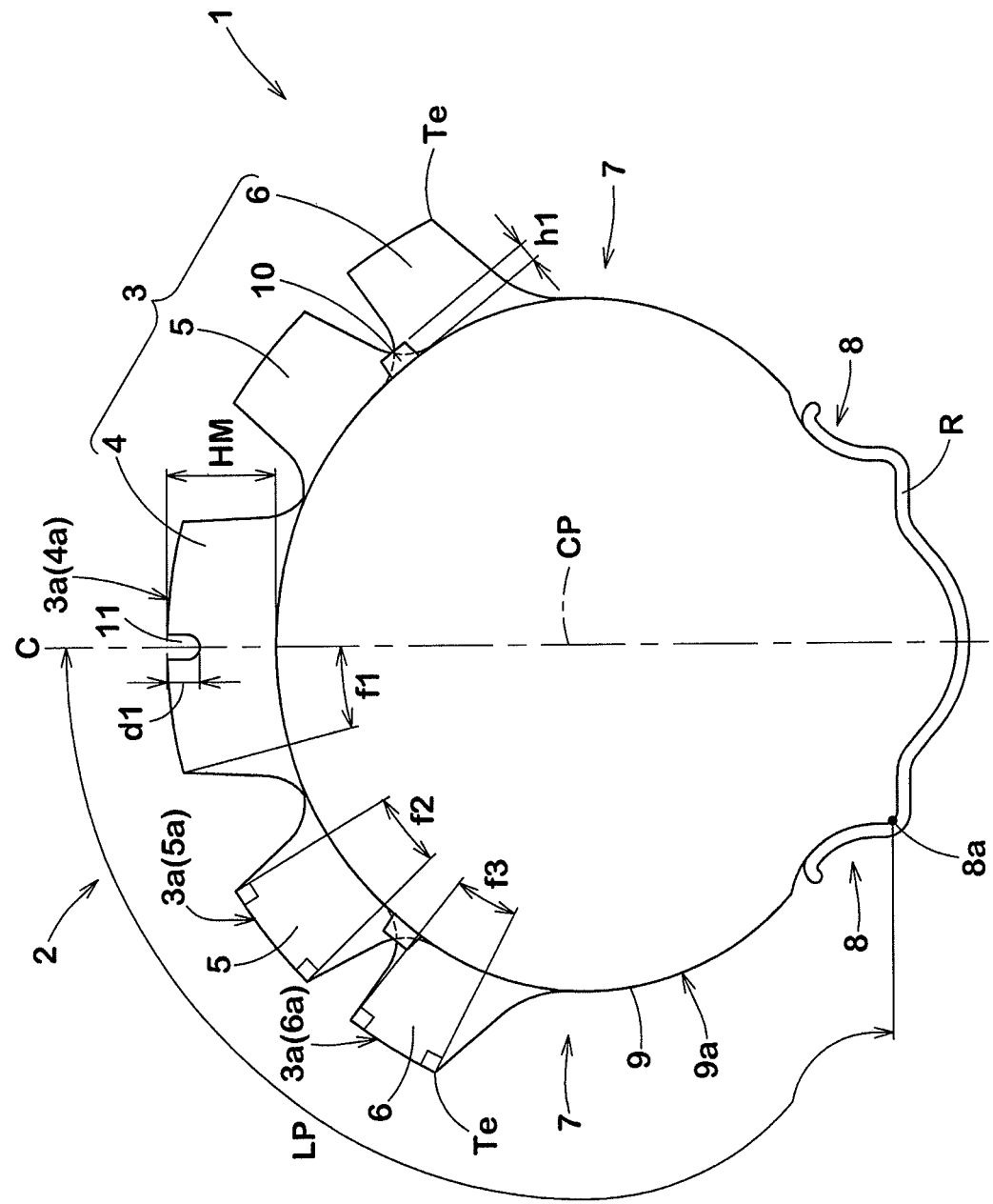
FIG. 2 is a cross-sectional view taken along the line A-A of FIG. 1.

FIG. 2 is a cross-sectional view of the tyre 1 under a standard condition in accordance with the embodiment taken along the line A-A of FIG. 1. Note that the internal structure of the tyre 1 was omitted to help readers understanding easier. As used herein, the standard condition is such that the tyre 1 is mounted on a standard wheel rim R and inflated to a standard pressure but loaded with no tyre load. In this application including specification and claims, various dimensions, positions and the like of the tyre 1 refer to those under the standard condition of the tyre 1 unless otherwise noted.

As used herein, the standard wheel rim is a wheel rim officially approved or recommended for the tyre 1 by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tyre by standards organizations, wherein the standard pressure is the "maximum air pressure" in JATMA, the "Inflation Pressure" in ETRTO, and the maximum pressure given in the "Tyre Load Limits at Various Cold Inflation Pressures" table in TRA or the like, for example.

As illustrated in FIG. 2, the tyre 1 according to the embodiment further includes a tyre main body 9 that continuous over the tyre circumferential direction at a same cross-sectional shape and that extends between axially spaced bead portions 8 through the tread portion 2 and sidewall portions 7. The tyre main body 9 has a predetermined outer surface length LP from a tyre equatorial plane CP to a bottom 8a of one of the bead portions 8.

In this embodiment, the crown blocks 4 are arranged such that when ground contact surfaces 4a of the crown blocks 4 are projected onto the outer surface 9a of the tyre main body 9 along each tyre normal line of the crown blocks 4, each projected region f1 of the crown blocks 4 is located within a region of 13% of the outer surface length LP of the tyre main body 9 from the tyre equatorial plane CP. Such a tread portion 2 excels in mud discharging property by allowing void on areas exceeding 13% of the outer surface length LP of the tyre main body 9 from the tyre equatorial plane CP.

In this embodiment, the middle blocks 5 are arranged such that when ground contact surfaces 5a of the middle blocks 5 are projected onto the outer surface 9a of the tyre main body 9 along each tyre normal line of the middle blocks 5, each projected region f2 of the middle blocks 5 is located in a region ranging from 20% to 34% of the outer surface length LP of the tyre main body 9 from the tyre equatorial plane CP. Such a tread portion 2 excels in mud discharging property by allowing void on areas being smaller than 20% of the outer surface length LP of the tyre main body 9 from the tyre equatorial plane CP.

In this embodiment, the shoulder blocks 6 are arranged such that when ground contact surfaces 6a of the shoulder blocks 6 are projected onto the outer surface 9a of the tyre main body 9 along each tyre normal line of the shoulder blocks 6, each projected region f3 of the shoulder blocks 6 is located in a region ranging from 36% to 47% of the outer surface length LP of the tyre main body 9 from the tyre equatorial plane CP. Such a tread portion 2 excels in mud discharging property upon cornering by allowing void on areas being smaller than 36% of the outer surface length LP of the tyre main body 9, i.e., a region ranging from 34% to 36% from the tyre equatorial plane CP.

As illustrated in FIG. 2, the crown blocks 4 and the middle blocks 5 are preferably separated from one another in the tyre axial direction when viewed from the tyre circumferential direction (i.e., when the crown blocks 4 and the middle blocks 5 are projected onto a tyre meridian cross-section). Such a tread portion 2, when straight traveling, may suppress sideslip using axially spaced circumferentially extending edges of the crown blocks 4. Further, the tread portion 2, due to the edge effect in the tyre axial direction of the middle blocks 5, may suppress sideslip when cornering. Thus, the tread portion 2 according to the embodiment can improve both straight-traction and cornering performance.

Preferably, the middle blocks 5 and the shoulder blocks 6 are overlapped with each other in the tyre axial direction when viewed from the tyre circumferential direction (i.e., when the middle blocks 5 and the shoulder blocks 6 are projected onto a tyre meridian cross-section). Such a tread portion 2 may improve cornering performance further by providing a high pattern rigidity region where the middle blocks 5 and the shoulder blocks 6 overlap.

As illustrated in FIG. 1 and FIG. 2, the tread portion 2 preferably includes one or more reinforcing portions 10 each connecting one middle block 5 and the adjacent shoulder block 6 is provided. The reinforcing portions 10 can improve cornering performance by enhancing rigidity of the middle blocks 5 and the shoulder blocks 6.

The reinforcing portions 10, for example, protrude radially outwardly from the outer surface 9a of the tyre main body 9. Protruding heights h1 of the reinforcing portions 10 from the outer surface 9a are preferably in a range of from 10% to 20% of the maximum height HM of the crown blocks 4. Widths w1 of the reinforcing portions 10 measured perpendicular to the longitudinal direction are preferably in a range of from 1.5% to 4.0% of the tread width TW. As used herein, the tread width TW is defined as an axial width between the tread edges Te of the tread portion 2. Such reinforcing portions 10 can enhance rigidity of the middle blocks 5 and the shoulder blocks 6 moderately, improving cornering performance further.

As illustrated in FIG. 1 and FIG. 2, the crown blocks 4 according to the embodiment each are provided with a crown shallow groove 11 extending on and along the tyre equator C. The crown shallow groove 11, for example, has a groove bottom configured as a semi-circular shape. Such a crown shallow groove 11 can relax rigidity of ground contact surfaces 4a of the crown blocks 4, improving straight-traction performance on hard road surfaces.

Preferably, a groove depth d1 of the crown shallow groove 11 is in a range of from 10% to 35% of the maximum height HM of the crown blocks 4. In this embodiment, the maximum height HM of the crown blocks 4 is a height from the outer surface 9a to the ground contact surfaces 4a of the crown blocks 4. Preferably, a groove width w2 of the crown shallow groove 11 measured perpendicular to the longitudinal direction thereof is in a range of from 1.5% to 3.5% of the tread width TW. Such a crown shallow groove 11 can maintain the rigidity of ground contact surfaces 4a of the crown blocks 4 in an appropriate range, improving straight-traction performance.

As illustrated in FIG. 1, the middle blocks 5 according to the embodiment are provided with middle shallow grooves 12 on the ground contact surface 5a. The middle shallow grooves 12, for example, are configured as a lateral U-shaped manner that opens at the axially outer edge of the ground contact surface 4a of each middle block 5. Such middle shallow grooves 12 can relax the rigidity of ground contact surfaces 5a of the middle blocks 5, improving straight-traction performance on hard road surfaces.

The shoulder blocks 6 are provided with shoulder shallow grooves 13 on the ground contact surfaces 6a. The shoulder shallow grooves 13, for example, are configured as a lateral U-shaped manner that opens at the axially inner edge of the ground contact surface 6a of each shoulder block 6. Such shoulder shallow grooves 13 can relax the rigidity of ground contact surfaces 6a of the shoulder blocks 6, improving straight-traction performance on hard road surfaces.

While the particularly preferable embodiments in accordance with the present disclosure have been described in detail, the present disclosure is not limited to the illustrated embodiments, but can be modified and carried out in various aspects.

EXAMPLE

Two-wheeled vehicle tyres for traveling rough terrain having a block arrangement shown in FIGS. 1 and 2 were prototyped based on the detail shown in Table 1. Then, these test tyres were tested as attached to a rear wheel of a motorcycle.

The common specification and the testing methods for the test tyres are as follows:
test vehicle: a motorcycle having a displacement of 450 cc;
tyre size: 120/90-19;
rim size: 2.15×19; and
inner pressure: 80 kPa.

Straight-Traction Performance Test:

The test rider drove the motorcycle equipped with each test tyre in order on a rough terrain test course having mixed hard and soft surfaces and evaluated the straight-traction performance by the rider's sense. The test results are indicated in Table 1 using a scoring system where the best is 10 points. The larger value indicates better the performance.

Cornering Performance Test:

The test rider drove the motorcycle equipped with each test tyre in order on the rough terrain test course and soft surfaces and evaluated the cornering performance by the rider's sense. The test results are indicated in Table 1 using a scoring system where the best is 10 points. The larger value indicates better the performance.

Mud Discharging Property Test:

The test rider drove the motorcycle equipped with each test tyre in order on the rough terrain test course and evaluated the mud discharging property by the rider's sense. The test results are indicated in Table 1 using a scoring system where the best is 10 points. The larger value indicates better the performance.

Table 1 shows the test results.

TABLE 1

|  | Ref. 1 | Ref. 2 | Ex. 1 | Ex. 2 | Ex. 3 | Ex. 4 | Ex. 5 | Ex. 6 | Ex. 7 |
|---|---|---|---|---|---|---|---|---|---|
| Crown block pitch lengths P1/middle block pitch lengths P2 | 0.8 | 1 | 1.14 | 1.5 | 1.14 | 1.14 | 1.14 | 1.14 | 1.14 |
| Crown shallow grooves | none | applied | applied | applied | none | applied | applied | applied | applied |
| Reinforcing portions | none | applied | applied | applied | applied | none | applied | applied | applied |
| Location (%) of crown block projected region f1 to outer surface length LP of tyre main body from tyre equatorial plane | 0 to 11 | 0 to 15 | 0 to 11 | 0 to 11 | 0 to 11 | 0 to 11 | 0 to 15 | 0 to 11 | 0 to 11 |
| Location (%) of middle block projected regions f2 to outer surface length LP of tyre main body from tyre equatorial plane | 22 to 34 | 16 to 28 | 22 to 32 | 22 to 32 | 22 to 32 | 22 to 32 | 22 to 32 | 16 to 28 | 22 to 32 |
| Location (%) of shoulder block projected regions f3 to outer surface length LP of tyre main body from tyre equatorial plane | 43 to 52 | 30 to 39 | 38 to 46 | 38 to 46 | 38 to 46 | 38 to 46 | 38 to 46 | 38 to 46 | 34 to 46 |
| Straight-traction performance (score) | 5 | 10 | 9 | 8 | 7 | 9 | 10 | 9 | 9 |
| Cornering performance (score) | 5 | 2 | 9 | 7 | 9 | 7 | 9 | 7 | 7 |
| Mud discharging property (score) | 5 | 3 | 9 | 6 | 8 | 8 | 7 | 7 | 6 |

From the test results, it is confirmed that the example tyres, compared with the comparative example tyres, improve in mud discharging property, straight-traction performance and cornering performance in a well-balanced manner.

What is claimed is:

1. A two-wheeled vehicle tire comprising:
a tread portion being provided with a row of crown blocks arranged on a tire equator,
a row of middle blocks arranged axially outwardly of the row of crown blocks, and
a row of shoulder blocks arranged axially outwardly of the row of middle blocks,
wherein circumferential pitch lengths of directly adjacent crown blocks are greater than circumferential pitch lengths of directly adjacent middle blocks,
wherein a reinforcing portion connecting one middle block and an adjacent shoulder block is provided,
wherein the reinforcing portion protrudes radially outwardly from an outer surface of a tire main body,
wherein plural reinforcing portions, which encompass the tire in a tire circumferential direction, are arranged in a continuous zigzag manner that alternates between the middle blocks and the shoulder blocks,
wherein widths of the plural reinforcing portions, measured perpendicularly to respective longitudinal directions of the plural reinforcing portions, are constant over entire lengths of the plural reinforcing portions, and
wherein the widths are in a range of from 1.5% to 4.0% of a tread width.

2. The two-wheeled vehicle tire according to claim 1, wherein
the circumferential pitch lengths of directly adjacent crown blocks are in a range of from 1.1 to 1.5 times the circumferential pitch lengths of directly adjacent middle blocks.

3. The two-wheeled vehicle tire according to claim 2, wherein
at least one of the crown blocks is provided with a crown shallow groove extending on and along the tire equator.

4. The two-wheeled vehicle tire according to claim 2, the tire further comprising
a tire main body that continuous over a tire circumferential direction at a same cross-sectional shape and that extends between axially spaced bead portions through the tread portion and sidewall portions, and
the middle blocks are arranged such that when ground contact surfaces of the middle blocks are projected onto an outer surface of the tire main body along each tire normal line of the middle blocks, each projected region of the middle blocks is located within a region of from 20% to 34% of an outer surface length of the tire main body from a tire equatorial plane to a bottom of one of the bead portions, from the tire equatorial plane.

5. The two-wheeled vehicle tire according to claim 2, wherein
the crown blocks and the middle blocks are separated from one another in a tire axial direction when viewed from a tire circumferential direction.

6. The two-wheeled vehicle tire according to claim 1, wherein
at least one of the crown blocks is provided with a crown shallow groove extending on and along the tire equator.

7. The two-wheeled vehicle tire according to claim 6, wherein
the crown shallow groove has a groove depth in a range of from 10% to 35% of a maximum height of the at least one of the crown blocks.

8. The two-wheeled vehicle tire according to claim 1, the tire further comprising
a tire main body that continuous over a tire circumferential direction at a same cross-sectional shape and that extends between axially spaced bead portions through the tread portion and sidewall portions, and
the crown blocks are arranged such that when ground contact surfaces of the crown blocks are projected onto an outer surface of the tire main body along each tire normal line of the crown blocks, each projected region of the crown blocks is located within a region of 13% of an outer surface length of the tire main body from a tire equatorial plane to a bottom of one of the bead portions, from the tire equatorial plane.

9. The two-wheeled vehicle tire according to claim 8, wherein the middle blocks are arranged such that when ground contact surfaces of the middle blocks are projected onto an outer surface of the tire main body along each tire normal line of the middle blocks, each projected region of the middle blocks is located within a region of from 20% to 34% of an outer surface length of the tire main body from a tire equatorial plane to a bottom of one of the bead portions, from the tire equatorial plane.

10. The two-wheeled vehicle tire according to claim 1, the tire further comprising
a tire main body that continuous over a tire circumferential direction at a same cross-sectional shape and that extends between axially spaced bead portions through the tread portion and sidewall portions, and
the middle blocks are arranged such that when ground contact surfaces of the middle blocks are projected onto an outer surface of the tire main body along each tire normal line of the middle blocks, each projected region of the middle blocks is located within a region of from 20% to 34% of an outer surface length of the tire main body from a tire equatorial plane to a bottom of one of the bead portions, from the tire equatorial plane.

11. The two-wheeled vehicle tire according to claim 1, wherein
the crown blocks and the middle blocks are separated from one another in a tire axial direction when viewed from a tire circumferential direction.

12. The two-wheeled vehicle tire according to claim 1, the tread portion further comprising
a row of shoulder blocks arranged axially outwardly of the row of middle blocks, wherein circumferential pitch lengths of directly adjacent shoulder blocks are same as the circumferential pitch lengths of directly adjacent middle blocks.

13. The two-wheeled vehicle tire according to claim 12, the tire further comprising
a tire main body that continuous over a tire circumferential direction at a same cross-sectional shape and that extends between axially spaced bead portions through the tread portion and sidewall portions, and
the shoulder blocks are arranged such that when ground contact surfaces of the shoulder blocks are projected onto an outer surface of the tire main body along each tire normal line of the shoulder blocks, each projected region of the shoulder blocks is located within a region of from 36% to 47% of an outer surface length of the tire main body from a tire equatorial plane to a bottom of one of the bead portions, from the tire equatorial plane.

14. The two-wheeled vehicle tire according to claim 12, wherein
the middle blocks and the shoulder blocks are overlapped with each other in a tire axial direction when viewed from a tire circumferential direction.

15. The two-wheeled vehicle tire according to claim 1, wherein the reinforcing portions do not connect the directly adjacent shoulder blocks in the tire circumferential direction, and
wherein the reinforcing portions do not connect the directly adjacent middle blocks in the tire circumferential direction.

16. The two-wheeled vehicle tire according to claim 1, wherein the plural reinforcing portions consist of first reinforcing portions inclined in a first direction at a first angle with respect to the tire circumferential direction, and second reinforcing portions inclined in a second direction opposite to the first direction with respect to the tire circumferential direction at a second angle with respect to the tire circumferential direction, and
wherein absolute values of the first angle and the second angle are the same as with each other.

17. The two-wheeled vehicle tire according to claim 1, wherein each middle block is provided with a middle shallow groove on a ground contact surfaces thereof,
wherein the middle shallow groove extends in a lateral U-shaped manner that opens at an axially outer edge of the ground contact surface of each middle block so as to divide the ground contact surface of the middle block into a middle base portion and a middle periphery portion surrounding the middle base portion,
wherein each shoulder block is provided with a shoulder shallow groove on a ground contact surfaces thereof,
wherein the shoulder shallow groove extends in a lateral U-shaped manner that opens at an axially inner edge of the ground contact surface of each shoulder block so as to divide the ground contact surface of the shoulder block into a shoulder base portion and a shoulder periphery portion surrounding the shoulder base portion,
wherein the plural reinforcing portions are connected to only the middle periphery portions and the shoulder periphery portions, and
wherein the middle base portions and the shoulder base portions are not connected to the plural reinforcing portions.

18. A two-wheeled vehicle tire comprising:
a tread portion being provided with a row of crown blocks arranged on a tire equator,
a row of middle blocks arranged axially outwardly of the row of crown blocks, and
a row of shoulder blocks arranged axially outwardly of the row of middle blocks,
wherein circumferential pitch lengths of directly adjacent crown blocks are greater than circumferential pitch lengths of directly adjacent middle blocks,
wherein plural reinforcing portions, which encompass the tire in a tire circumferential direction, are arranged in a continuous zigzag manner that alternates between the middle blocks and the shoulder blocks,
wherein the reinforcing portion protrudes radially outwardly from an outer surface of a tire main body and a height of the reinforcing portion from the outer surface is in a range of from 10% to 20% of a maximum height of the crown blocks,
wherein a width of the reinforcing portion measured perpendicular to a longitudinal direction of the reinforcing portion is constant over an entire length of the reinforcing portion, and
wherein the width is in a range of from 1.5% to 4.0% of a tread width.

19. A two-wheeled vehicle tire comprising:
a tread portion being provided with a row of crown blocks arranged on a tire equator,
a row of middle blocks arranged axially outwardly of the row of crown blocks, and
a row of shoulder blocks arranged axially outwardly of the row of middle blocks,
wherein circumferential pitch lengths of directly adjacent crown blocks are greater than circumferential pitch lengths of directly adjacent middle blocks, such that there are four kinds of different circumferential gaps including first, second, third and fourth gaps L1-L4, respectively, are provided on the rows of the crown blocks and the middle blocks, wherein the first gap L1 is in a range of from 0% to 0.3% of a tire entire circumferential length measured on the tire equator C, the second gap L2 is in a range of from 0.1% to 0.5% of the tire entire circumferential length, the third gap L3 is in a range of from 0.3% to 1.0% of the tire entire circumferential length, and the fourth gap L4 is in a range of from 0.5% to 1.3% of the tire entire circumferential length, wherein plural reinforcing portions, which encompass the tire in a tire circumferential direction, are arranged in a continuous zigzag manner that alternates between the middle blocks and the shoulder blocks, wherein a width of the reinforcing portion measured perpendicularly to a longitudinal direction of the reinforcing portion is constant over an entire length of the reinforcing portion, and wherein the width is in a range of from 1.5% to 4.0% of a tread width.

\* \* \* \* \*